United States Patent
Tsukamoto et al.

(10) Patent No.: US 7,500,259 B2
(45) Date of Patent: Mar. 3, 2009

(54) VIDEO SIGNAL RECEIVER WITH DAYLIGHT SAVINGS TIME TRANSITION SUPPORT

(75) Inventors: Keisuke Tsukamoto, Osaka (JP); Toshihiro Takagi, Osaka (JP)

(73) Assignee: Funai Electric co., Ltd., Osaka (JP)

( * ) Notice: Subject to any disclaimer, the term of this patent is extended or adjusted under 35 U.S.C. 154(b) by 1067 days.

(21) Appl. No.: 10/458,934

(22) Filed: Jun. 11, 2003

(65) Prior Publication Data

US 2003/0233654 A1 Dec. 18, 2003

(30) Foreign Application Priority Data

Jun. 13, 2002 (JP) .................... P2002-172908

(51) Int. Cl.
G06F 3/00 (2006.01)
G06F 13/00 (2006.01)
H04N 5/445 (2006.01)

(52) U.S. Cl. .............. 725/44; 725/50; 725/52
(58) Field of Classification Search .......... None
See application file for complete search history.

(56) References Cited

U.S. PATENT DOCUMENTS 5,844,620 A * 12/1998 Coleman et al. .............. 725/54
6,886,133 B2 * 4/2005 Bailey et al. ................. 715/531
2004/0049794 A1 * 3/2004 Shao et al. .................... 725/89
2005/0273819 A1 * 12/2005 Knudson et al. .............. 725/58

FOREIGN PATENT DOCUMENTS

| JP | 10-503628 | 3/1998 |
| JP | 11-23744 | 1/1999 |
| WO | WO-95/31069 | 11/1995 |

OTHER PUBLICATIONS

Japanese Office Action for Japanese patent application 2002-17908, issued Nov. 13, 2006, and English translation thereof, 4 pages.
Patent Abstracts of Japan, Publication No. 11-023744, Publication Date: Jan. 29, 1999, 1 page.

(Continued)

*Primary Examiner*—Vivek Srivastava
*Assistant Examiner*—Mushfikh Alam
(74) *Attorney, Agent, or Firm*—Osha • Liang LLP

(57) ABSTRACT

At a starting of a summer time, an indication "D.S.T." is displayed on an EPG screen with a deleted time zone in a different background color from other time zones. The deleted time zone is displayed in a flashed manner, and "D.S.T.START" is indicated at a start time of the summer time. At an end of the summer time, a time indicating a repeated time zone is displayed in a flashed manner on an EPG screen, and "D.S.T.END" is indicated at an end time of the summer time. When a user makes a reservation in a deleted time or repeated time zone, it is displayed that the reservation is invalid on the EPG screen.

11 Claims, 14 Drawing Sheets

OTHER PUBLICATIONS

Patent Abstracts of Japan, Publication No. 2001-066384, Mar. 16, 2001, 2 pp.
Japanese Unexamined Patent Publication No. 2001-66384 dated Mar. 16, 2001, 4 pp.
Patent Abstracts of Japan, Publication No. 2001-083268, Mar. 30, 2001, 2 pp.
Japanese Unexamined Patent Publication No. 2001-83268 dated Mar. 30, 2001, 12 pp.
Patent Abstracts of Japan, Publication No. 2001-042067, Feb. 16, 2001, 2 pp.
Japanese Unexamined Patent Publication No. 2001-42067 dated Feb. 16, 2001, 4 pp.

* cited by examiner

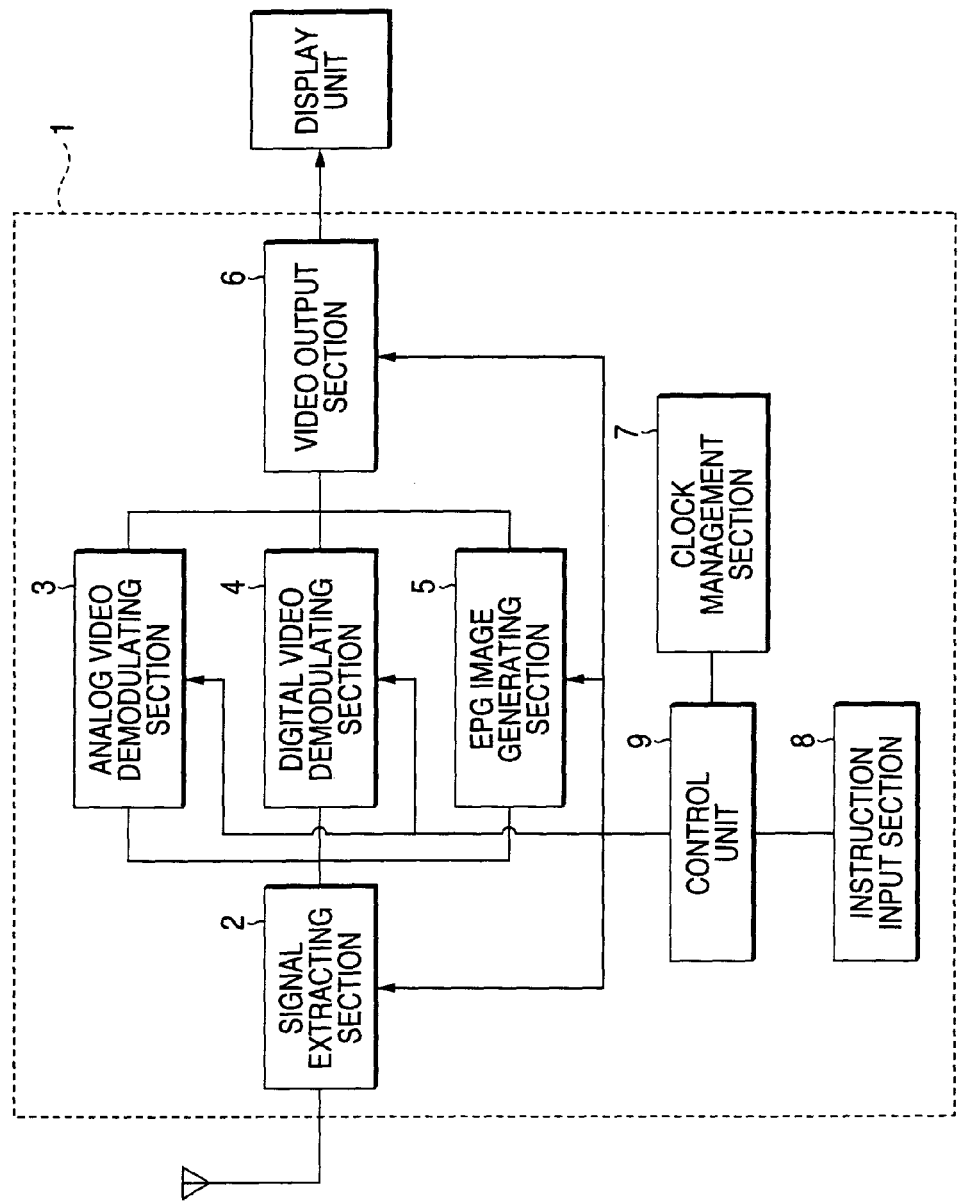

VIDEO SIGNAL RECEIVER WITH DAYLIGHT SAVINGS TIME TRANSITION SUPPORT

BACKGROUND OF THE INVENTION

1. Field of the Invention

The present invention relates to an image signal receiver for demodulating a video signal to be output and outputting an EPG (Electronic Program Guide) image, and more specifically to an image signal receiver that is employed in a district using the D.S.T. (Daylight Saving Time) or the summer time.

2. Description of the Related Art

D.S.T. (Daylight Saving Time) is a time in which one year is divided into a period having longer duration of sunshine and a period having shorter duration of sunshine, and the time is shifted from one period to another at a certain time and date. In the period having longer duration of sunshine, the time is shifted one hour forward at a predetermined time and date (summer time), whereby in the following days, it is used to advance the time from sunrise to the start of the working hours and to make effective use of daylight after the sunrise. In the period of having shorter duration of sunshine, the time is shifted one hour backward at a predetermined time and date by repeating the same hour and returned to the original time (standard time). A relationship between the summer time and the standard time is shown in FIG. 9.

As shown in FIG. 9, when the summer time begins, the time is shifted one hour forward at AM 2:00 on April 1 in the standard time to AM 3:00, whereby the following time is one hour earlier than the standard time. In this case, the time from AM 2:00 to AM 3:00 on April 1 is deleted.

In the summer time, the time is shifted one hour backward at AM 2:00 on October 1 in the summer time to AM 1:00 at the second time, whereby the time is one hour later and coincides with the standard time. In this case, the time from AM 1:00 to AM 2:00 is repeated.

However, because the standard time and the summer time reside, a number of problems arise due to a time shift at the time of switching.

To solve the problems, the following techniques have been offered.

In Japanese Patent No. 3,230,731, a time adjusting device is disclosed in which an alarm sound is raised when a reservation start time or end time is involved in the time to be deleted at the start of the summer time, and the reservation is made invalid if the reservation start time or end time is involved in the time repeated at the end of the summer time.

In JP-A-2001-066384, a timer reservation device is disclosed in which a timer reservation time is set in the standard time or the summer time depending on the time of the year. The timer reservation device discriminates whether the reservation time is set in the standard time or summer time, acquires an offset value between the standard time and the summer time, and sets the timer reservation in either one time based on the offset value.

In JP-A-2001-083268, a telephone set is disclosed in which the time for raising an alarm is preset, and an preset time is automatically reset to a new time (time after transition) when transiting from the standard time to the summer time, or from the summer time to the standard time.

In JP-A-2001-042067, an electric appliance and an air-conditioner are disclosed in which the time is shifted forward by a predetermined time at a first specific day, and shifted backward by the predetermined time at a second specific day.

Recently, a video signal is digitized to enable video from more numbers of broadcasting stations to be transmitted or received at a same time, so that a multi-channel configuration has been progressed. Accordingly, an EPG (Electronic Program Guide) is becoming widely used in which programs on many channels can be displayed on a screen of a display unit at a time.

In the EPG, program information (including information such as contents of each program and broadcasting time) for a certain period is superposed in an image signal and transmitted. A video signal receiving apparatus receives and demodulates the image signal and displays the program information obtained from the image signal on a display as a EPG screen as shown in FIG. 10.

On the EPG screen, a time axis is taken along the transverse direction and a plurality of channels are set along the longitudinal direction in a timetable display frame 100, whereby a program timetable on each channel is displayed in time series along the transverse direction, as shown in FIG. 10. In this manner, the program timetable on multiple channels is listed. When a user selects a program to be viewed or recorded on the EPG screen by a certain input method, content of the program selected in the program timetable by the user is displayed in a content display frame 102. The user sees the content display frame 102 and confirms the content of the program. Also, if the user makes predetermined inputs to make a recording reservation, information of the recording reservation is displayed in the content display frame 102. Along with the display frames 100 and 102, a video display frame 103 for displaying the program currently selected by the user may be provided.

However, the time information of the program displayed on the EPG screen is given in either one of the standard time and the summer time (e.g., standard time). For example, the information indicating at what time a program is started in the standard time and how long the program is broadcasted. The video signal receiver demodulates this signal and outputs it on the EPG screen as shown in FIG. 10.

TherEFGre, at the time of transiting from the standard time to the summer time, if the display time on the EPG screen is kept in the standard time (DST OFF) as shown in FIGS. 11A and 11B, the time of the district where the user lives is one hour earlier than the displayed time on the EPG screen after transition of the time. Accordingly, even though the broadcast time is confirmed with the EPG screen, a time schedule of program differs by an amount of difference between the time on the perpetual calendar and the EPG display time, whereby the user cannot watch an intended program.

On the other hand, at the time of ending the summer time and transiting to the standard time, when the EPG screen is displayed in the standard time, as shown in FIGS. 12A and 12B, the time of the district where the user lives is one hour ahead, bEFGre transition. TherEFGre, when the broadcast time is confirmed with the EPG screen, the time schedule of program differs by an amount of difference between the time on the perpetual calendar and the EPG display time, whereby the user cannot watch the intended program.

Due to the above described causes, it is conventionally difficult to know whether display is made in the standard time or summer time when starting and ending the summer time, making it impossible to make a distinction between the summer time and the standard time, and possibly confusing the user.

Any of the four conventional techniques do not solve the above problem.

SUMMARY OF THE INVENTION

It is therEFGre an object of the invention to provide a video signal receiver having an EPG screen on which the user can easily know a time transition at a time of starting and ending the summer time, and thereby view and make recording reservation of a program without making mistakes.

In order to achieve the above object, according to a first aspect of the invention, there is provided a video signal receiver including: a video generating section adapted to demodulate a received video signal and to output a video image; an EPG image generating section adapted to generate an EPG image on the basis of an EPG information contained in the video signal, and to output the EPG image to be displayed on a display screen; a control section adapted to control the video image and the EPG image by controlling the video generating section and the EPG image generating section in accordance with an input made by a user; and a time management section adapted to store a standard time, a summer time, a start time for transiting from the standard time to the summer time, and an end time for transiting from the summer time to the standard time, wherein the control section includes a display part adapted to change a time to be displayed in the EPG image on the basis of the time information stored in the time management section, to selectively display the EPG image in the standard time or summer time, and to display the start time of summer time and the end time of summer time when the EPG image is displayed in the summer time.

According to the first aspect of the invention, in transiting from the standard time to the summer time and from the summer time to the standard time, the display time of the EPG image is changed, and the time at the boundary between the summer time and the standard time is indicated, whereby the switching time between the summer time and the standard time is easily discriminated.

According to a second aspect of the invention, in addition to the first aspect of the invention, the display part displays a time zone to be deleted due to the starting of the summer time, on the basis of information relating to the starting time of the summer time stored in the time management section.

According to the second aspect of the invention, in transiting from the standard time to the summer time, a deleted time zone (for instance, of one hour from AM 2:00) is displayed in the EPG image, whereby it is easily discriminated that this time zone is different from the other time zones, and does not exist in reality.

According to a third aspect of the invention, in addition to the first aspect of the invention, the display part displays, when a time zone for making a viewing or a recording relates to a time zone to be deleted due to the starting of the summer time, an indication in the EPG image that the time zone to be deleted does not exist.

According to the third aspect of the invention, even though the user makes a viewing or recording reservation in the time zone deleted at the time of starting the summer time, an invalidity is indicated, whereby the user can easily know that the reservation is invalid and it is necessary to make the reservation again.

According to a fourth aspect of the invention, in addition to the first aspect of the invention, the display part generates a reservation content display image for displaying a viewing/recording reservation, which is different from the EPG image, on the basis of a viewing/recording reservation information input by the user, and displays, when a time zone for making a viewing or a recording relates to a time zone to be deleted due to the starting of the summer time, an indication in the reservation content display image that the time zone to be deleted does not exist.

According to the fourth aspect of the invention, when the viewing/recording reservation is input from the user, the screen for displaying the reservation content is generated in accordance with the viewing/recording reservation, whereby the user can confirm the reservation content. When the reservation content is involved in the time zone to be deleted at the time of starting the summer time, the display part displays the reservation content, whereby the user can easily know that the reservation content is invalid and it is necessary to make the reservation again.

According to a fifth aspect of the invention, in addition to the first aspect of the invention, the display part displays a time zone repeated at the time of ending the summer time in a continuous manner in the EPG image, on the basis of information relating to the ending time of the summer time stored in the time management section. The display part also displays an indication that each of a time zone repeated corresponds to a first time zone and a second time zone in the EPG image.

According to the fifth aspect of the invention, in transiting from the summer time to the standard time, the repeated time zone (for instance, from AM 1:00 to AM 2:00) is displayed in the EPG image in a continuous manner, and whether the repeated time zone is at the first or second time is displayed, whereby the user can easily know that the same time zone is repeated twice.

According to a sixth aspect of the invention, in addition to the first aspect of the invention, the display part displays, when a time zone for making a viewing or a recording relates to a time zone to be repeated due to the starting of the summer time, an indication in the EPG image that the time zone repeated takes place twice repetitively, and an indication to let the user to select the time zone for making the viewing or the recording from the first time zone and the second time zone.

According to the sixth aspect of the invention, when the viewing/recording reservation time zone is involved in the time zone repeated at the time of ending the summer time, the-display part indicates that it is uncertain whether the time zone is at the first or second time, whereby the user can easily know that it is necessary to make the specification again.

According to a seventh aspect of the invention, in addition to the first aspect of the invention, the display part generates a reservation content display image for displaying a viewing/recording reservation, which is different from the EPG image, on the basis of a viewing/recording reservation information input by the user, and displays, when a time zone for making a viewing or a recording relates to a time zone to be repeated due to the ending of the summer time, an indication in the reservation content display image that the time zone repeated takes place twice repetitively, and an indication to let the user to select the time zone for making the viewing or the recording from the first time zone and the second time zone.

According to the seventh aspect of the invention, when the reservation time zone for making the viewing/recording is involved in the time zone repeated at the time of ending the summer time, the display part indicates that it is uncertain whether the time zone is at the first or second time, whereby the user can easily know that it is necessary to make the specification again.

BRIEF DESCRIPTION OF THE DRAWINGS

The above objects and advantages of the present invention will become more apparent by describing preferred exemplary embodiment thereof in detail with reference to the accompanying drawings, wherein:

FIG. 1 is a block diagram of a video signal receiver according to one aspect of the invention;

DETAILED DESCRIPTION OF THE PREFERRED EMBODIMENTS

Figure 2A:
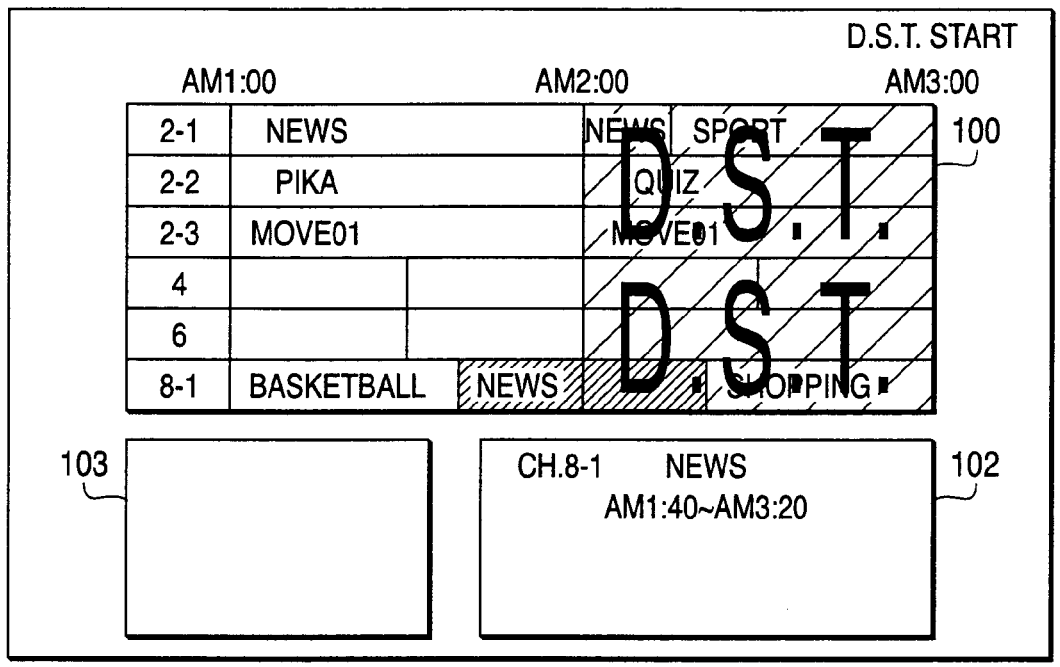
FIGS. 2A and 2B are views showing an EPG image at a time of starting the summer time.

A video signal receiver according to an embodiment of the invention will be described below with reference to the accompanying drawings.

FIG. 1 is a block diagram showing an outline of the video signal receiver.

As shown in FIG. 1, the video signal receiver 1 includes a signal extracting section 2, an analog video demodulating section 3, a digital video demodulating section 4, an EPG image generating section 5, a video output section 6, a time management section 7, an instruction input section 8 and a control section 9.

The signal extracting section 2 extracts a signal (channel) contained in a video that is displayed on a display unit from a plurality of video signals (channels) received at an antenna connected to a input terminal thereof. Herein, a channel to be extracted is designated by the control section 9. A user operates the instruction input section 8 (e.g., remote controller) in a predetermined way to designate the channel for the control section 9. An analog signal extracted by the signal extracting section 2 is output to the analog video demodulating section 3, and a digital signal extracted by the signal extracting section 2 is output to the digital video demodulating section 4.

When the extracted signal is analog signal, the analog video demodulating section 3 demodulates the signal to generate a video and outputs the video to the video output section 6. When the extracted signal is digital signal, the digital video demodulating section 4 demodulates the signal to generate a video and outputs the video to the video output section 6.

The EPG image generating section 5 generates an EPG image by extracting the EPG information contained in the signal received at the antenna and outputs the EPG image to the video output section 6.

The video output section 6 synthesizes the video generated by the analog video demodulating section 3 or the digital video demodulating section 4 and the EPG image generated by the EPG image generating section 5 and outputs a synthesized image to the display unit.

The time management section 7 contains a perpetual calendar, and stores a start date and an end date of the summer time, and a time difference between the standard time and the summer time, based on the perpetual calendar. The perpetual calendar keeps the standard time, in which when the summer time starts, the time is shifted one hour forward, and when the summer time ends, the time is shifted one hour backward by repeating the predetermined one hour, and restored to the standard time. On a predetermined date, the time management section 7 outputs the time information to the control section 9.

The instruction input section 8, when instruction to change the channel, to make a reservation for recording or viewing is input by the user, outputs the instruction to the control section 9. The user inputs the instruction by operating various setting buttons provided on a front panel of the apparatus front or on a remote controller.

The control section 9 includes at least one display part adapted to control the EPG image generating section 5 to generate and output a specific image according to the input by the user. The control section 9 sends to the signal extracting section 2 an instruction for displaying the designated channel in accordance with the input instruction. Upon a command from the time management section 7, the control section 9 changes the time indication for the video or EPG image to the summer time at the time of starting the summer time. The control section 9 controls the contents to be displayed as the EPG image by controlling the EPG image generating section 5.

The video signal receiver 1, as described above, extracts, demodulates and outputs a desired video to the display unit and outputs the EPG image.

A display method for the EPG image at the time of starting the summer time will be described below with reference to the drawings.

Figure 2B:
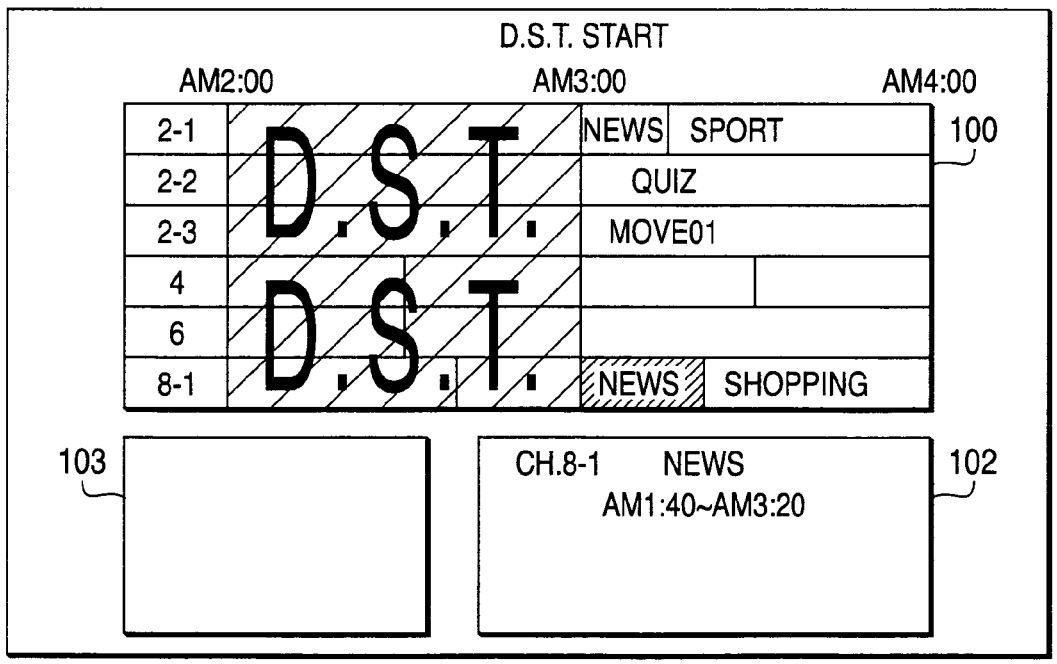

FIGS. 2A and 2B show the EPG images at the time of starting the summer time from AM 1:00 to AM 3:00 and from AM 2:00 to AM 4:00, respectively.

As shown in FIGS. 2A and 2B, the EPG image is composed of a timetable display frame 100 for displaying the programs for each channel in time series, a program content display frame 102 for displaying the program content upon selecting a predetermined position in a program table, and a video display frame 103 for displaying the video for the currently selected channel. The timetable display frame 100 takes the time along the transverse axis, and a plurality of channels along the longitudinal axis, in which the programs for each channel and the broadcast time are displayed, with the program name in a space for each program. The time is displayed on the upper side of this program table, whereby the user makes sure what program is broadcasted at which channel by seeing this program table frame. The program content display frame 102 displays the content of the program, the channel and the broadcast time, which the user selects in the timetable display frame 100, at the different positions from the timetable display frame 100. The user can confirm the content of selected program in detail. When the user selects to make a reservation for recording or viewing, the program content display frame 102 displays the content of the selected program, whereby the user reviews the displayed content and confirms the setup reservation.

The display for the EPG image at the time of starting the summer time will be described below.

In the case where the summer time starts, namely, the time zone bEFGre AM 3:00 at the first Sunday on April (till the start of the summer time) is displayed in the EPG image, a background of the time zone from AM 2:00 to AM 3:00 in the display image is displayed in a color different from the color of other time zones, and "D.S.T." is displayed in large size within the time zone frame, as shown in FIG. 2A. The program table from AM 3:00 to AM 4:00 is displayed translucently in this time zone. For example, in FIG. 2A, when NEWS at channel 8-1 is broadcasted for one hour from AM 1:40, the EPG image is normally selected from AM 1:40 to AM 2:00, and from AM 2:00 to AM 2:40 which actually does not exist, is displayed translucently in a region with a different background color ("D.S.T." region). The selected program frame is displayed in a different color from the colors of other regions as well as the "D.S.T." region. Also, the "D.S.T." is displayed from AM 2:00 to AM 2:30.

When the EPG screen from AM 2:00 to AM 4:00 (after the start of the summer time) is displayed by moving the cursor, no program is displayed and the "D.S.T." alone is displayed in the time zone from AM 2:00 to AM 3:00, as shown in FIG. 2B.

As described above, the time deleted at the time of starting the summer time is indicated. When the selected program extends over the "D.S.T." portion, a part of the program only relevant to bEFGre AM 2:00 and after AM 3:00 are only selected.

The time display at AM 2:00 and AM 3:00 is displayed in a flashed manner, and the "D.S.T. START" indicating the start time of summer time is displayed above the timetable display frame 100 at AM 3:00. In the program content display frame 102, the program broadcast time is displayed in the summer time.

By displaying the EPG image as described above, the user can easily and surely know that the summer time has been started, and that one hour from AM 2:00 to AM 3:00 is deleted. The user can also confirm the broadcast time of the program in the summer time basis. Also, the user can easily recognize a time shift along with the start of the summer time, correctly grasp the shifted program start time due to the time shift, and avoid missing the program for which the user wants to make a viewing/recording.

When the user sets the cursor to the program in the timetable display frame 100 to confirm the content or to make a reservation for viewing or recording, the cursor is prevented from moving into the time zone from AM 2:00 to AM 3:00 in which the background color is different from other time zone. That is, when the last program is selected bEFGre AM 2:00, and the cursor is moved in a time progress direction, the first program after AM 3:00 outside the time zone from AM 2:00 to AM 3:00 is selected. For the program extending over the D.S.T. time that does not actually exists, the program frame bEFGre and after the D.S.T. time is selected and displayed at the same time.

With above configuration, the user can easily and surely performs the operation of moving the cursor to confirm the content of program, and make a reservation for viewing or recording, without selecting the time zone deleted at the time of starting the summer time.

The display for the EPG image at the time of ending the summer time will be described below.

Figure 3A:
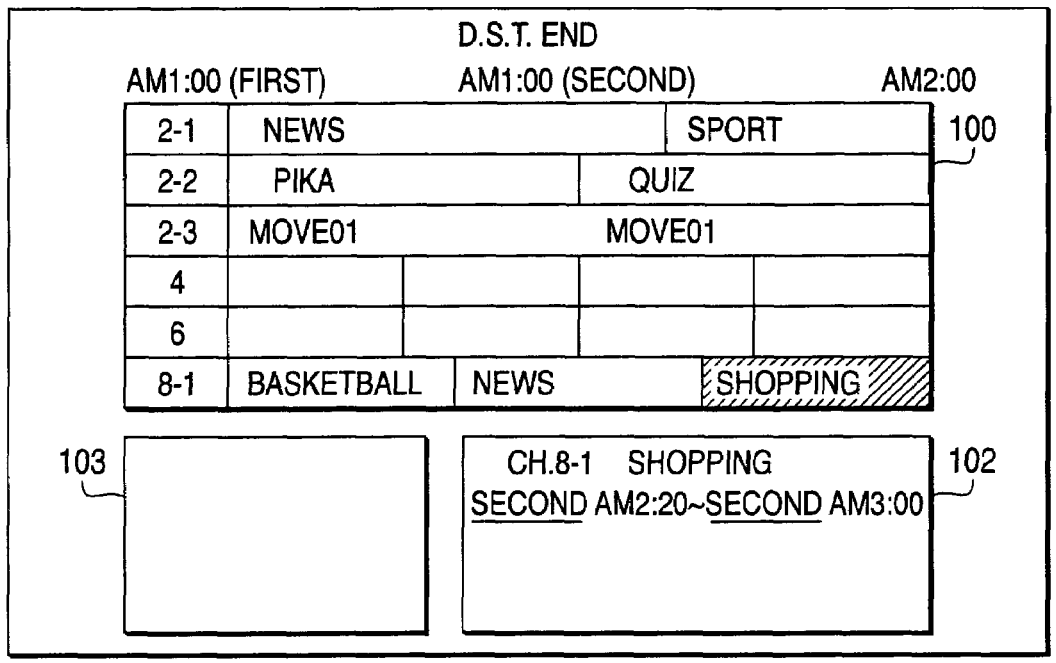
FIGS. 3A and 3B are views showing an EPG image at a time of ending the summer time.
Figure 3B:
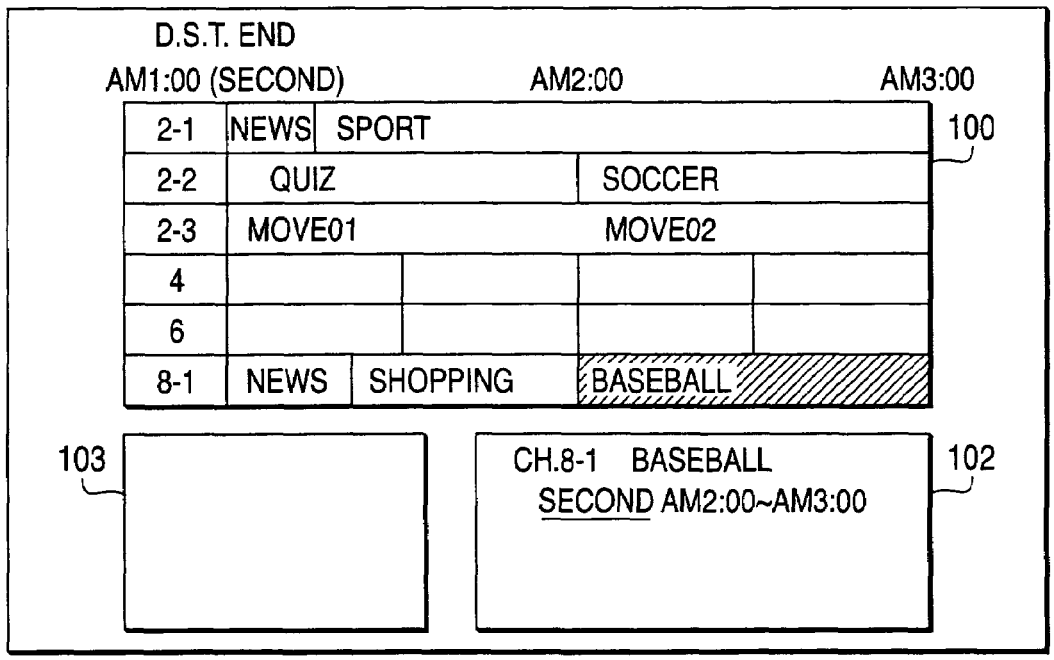

FIG. 3A shows an EPG image representing a program table from AM 1:00 (first time) to AM 2:00 in the summer time at the last Sunday on October, and FIG. 3B shows an EPG image representing a program table from AM 1:00 (second time) to AM 3:00.

At the time of ending the summer time, to coincide with the standard time, the time zone from AM 1:00 to AM 2:00 exists twice consecutively, that AM 2:00 at the first time turns AM 1:00 at the second time. To display the above, the time display above the timetable display frame 100 for the EPG image is made in time series such as AM 1:00 (FIRST), AM 1:00 (SECOND), AM 2:00 and AM 3:00. Also, the "D.S.T. END" indicating the end time of summer time is indicated above AM 1:00 (SECOND), and AM 2:00 is displayed in a flashed manner.

In the case where the start or end time of the program that the user selects with the cursor is involved in the repeated time zone, the repeated time zone concerned, namely, a distinction of the first or second time is indicated with FIRST or SECOND appended bEFGre the time in the program content display frame 102. For example, when the user sets the cursor to Shopping at channel 8-1, "SECOND AM 1:20 to AM 2:00" appears because the program is broadcasted from AM 1:20 at the second time to AM 2:00, as shown in FIG. 3A.

By displaying the EPG image in above manner, the user can easily and surely know the end of the summer time.

Figure 4:
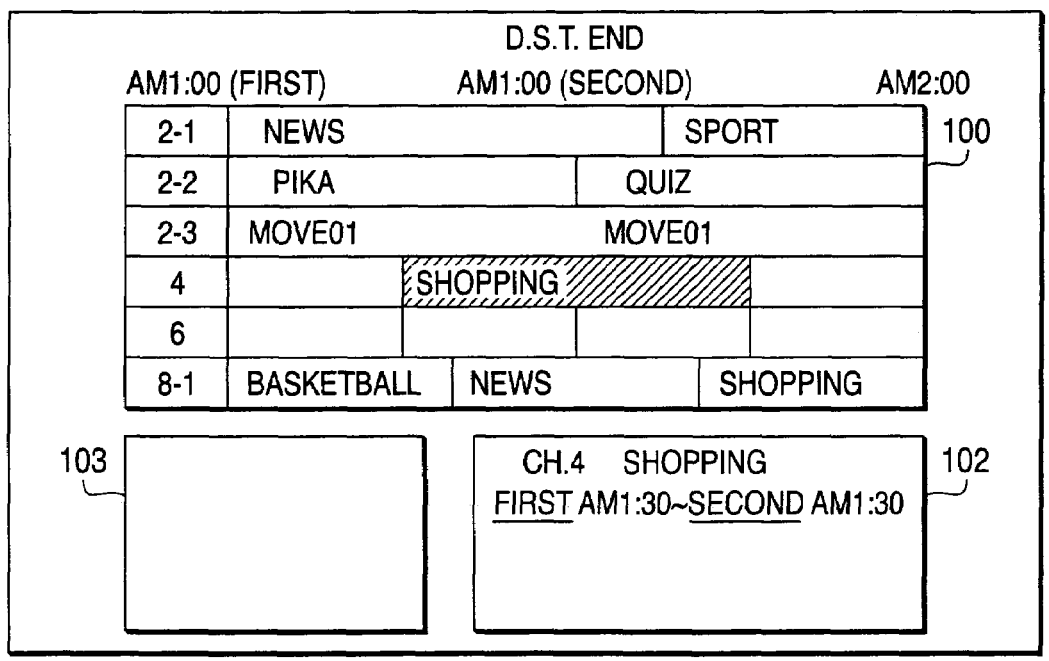
FIG. 4 is a view showing an image when a reservation setting is made using an EPG image at the time of ending the summer time.

With the EPG image, a display screen for setting a recording reservation in which the time involved in the repeated time zone is the start or end time is shown in FIG. 4.

FIG. 4 is a view showing an EPG image when making a recording reservation.

As shown in FIG. 4, when the user makes a reservation for a shopping program broadcasted from AM 1:30 at the first time to AM 1:30 at the second time at channel 4, a corresponding portion in the timetable display frame 100 is displayed in a different color from those of other portions. In the program content display frame 102, the channel number, program content, and broadcast time are also displayed as shown in FIG. 4. The broadcast time is displayed as "FIRST AM 1:30 to and SECOND AM 1:30", rather than simply "AM 1:30 to AM 1:30". By seeing the display, the user can easily and surely know the reservation made that the start time and end time corresponds to which of the first time and the second time in the repeated time zone. Accordingly, the user can view a desired program correctly and make a viewing or recording reservation certainly.

An example where the image for making the viewing/recording reservation is provided separately from an EPG image will be described below.

(1) At the Time where the Summer Time Starts

Figure 5A:
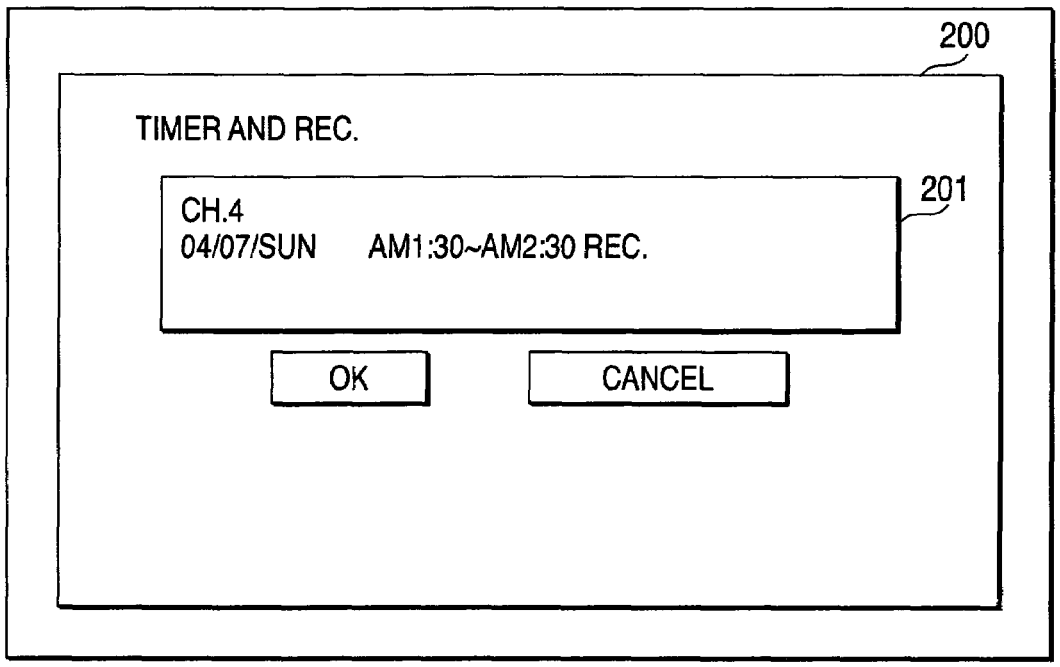
FIGS. 5A, 5B and 5C are views showing an image when a reservation is made using a viewing/recording reservation display frame at the time of starting the summer time.
Figure 5B:
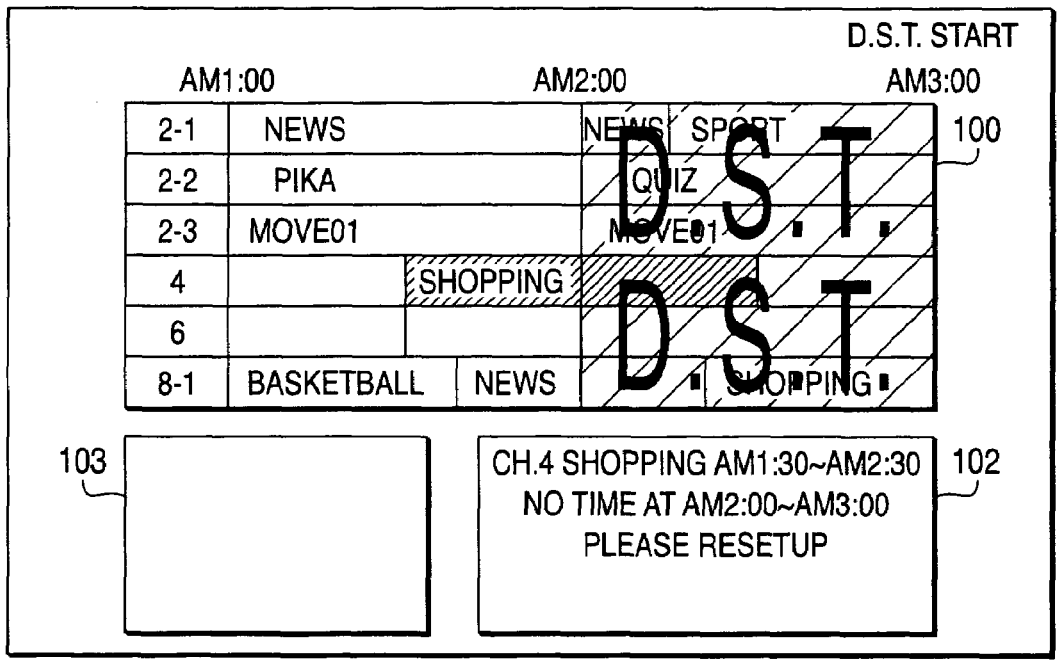
Figure 5C:
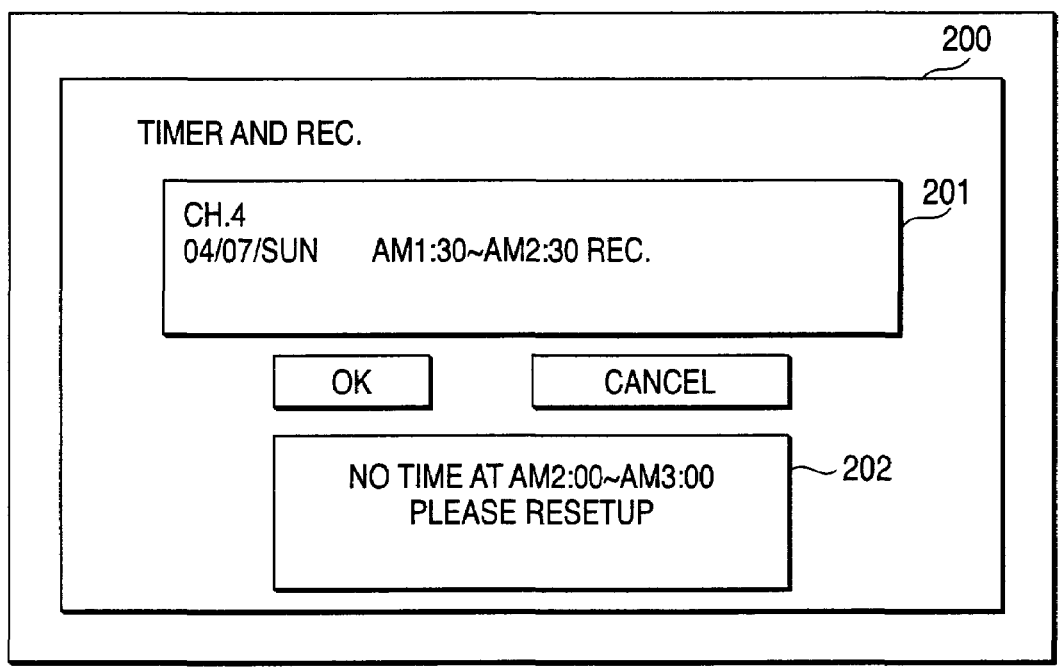

FIGS. 5A and 5C show a viewing/recording reservation image 200, and FIG. 5B shows an EPG image in which reservation of FIG. 5A is made.

As shown in FIG. 5A, the viewing/recording reservation image 200 includes an indication "Timer and Rec." indicating that this image is a screen for reservation operation, a reservation content display frame 201 indicating the reservation content, an "OK" button that is selected if the displayed content is matched with the input content, and a "CANCEL" button for canceling the reservation.

In this example, when the user selects the time deleted at the time of starting the summer time, for example, a recording reservation for channel 6 from AM 1:30 to AM 2:30 at first Sunday on April (7th day of April) is made, as shown in FIG. 5A, the corresponding channel and the time zone are displayed in the timetable display frame 100 of the EPG image, as shown in FIG. 5B. At the time of starting the summer time, because the time from AM 2:00 to AM 3:00 is deleted, the reserved time zone at the reserved channel is flashed to indicate that the time zone based on this reservation is involved in the deleted time zone in the timetable display frame 100 of the EPG image. It is also indicated in the program content display frame 102 that the time from AM 2:00 to Am 3:00 does not exist and the reservation needs to be made again. The content of the program content display frame 102 is also displayed in a details display frame 202 of the viewing/recording reservation image 200, as shown in FIG. 5C. Accordingly, the user can easily and surely know that the reservation made is invalid and re-input is necessary.

Figure 6A:
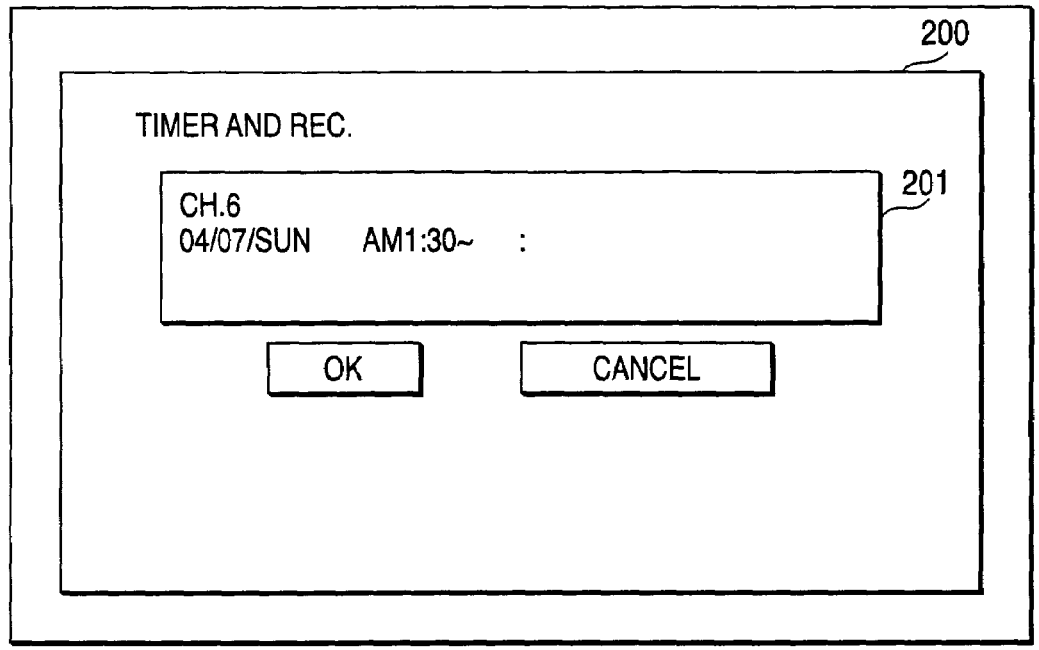
FIGS. 6A and 6B are views showing a section of the image when a reservation is made using another viewing/recording reservation display frame at the time of starting the summer time.
Figure 6B:
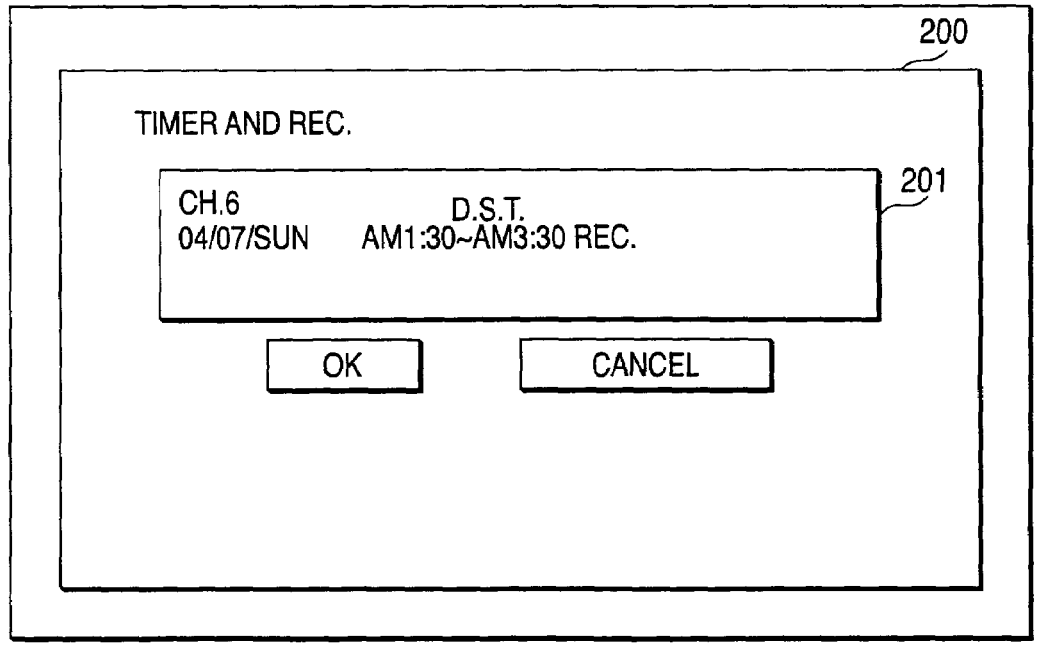

Though in the above explanation, the time from AM 2:00 to AM 3:00 is set as the reservation time, the time zone from AM 2:00 to AM 3:00 may be disabled for input, and the indication "D.S.T." indicating the summer time may be displayed in the set up time after AM 3:00, as shown in FIG. 6. By displaying in above manner, the user can easily and surely make a reservation except for the deleted time zone.

(2) At the Time where the Summer Time Ends

Figure 7A:
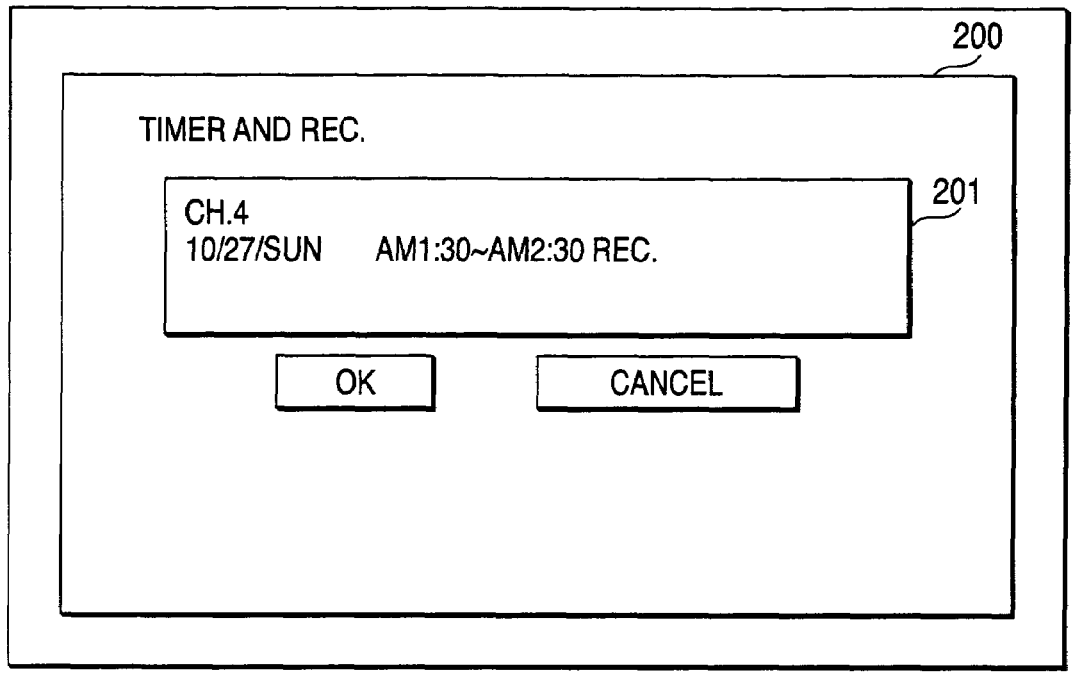
FIGS. 7A, 7B and 7C are views showing an image when a reservation is made using a viewing/recording reservation display frame at the time of ending the summer time.
Figure 7B:
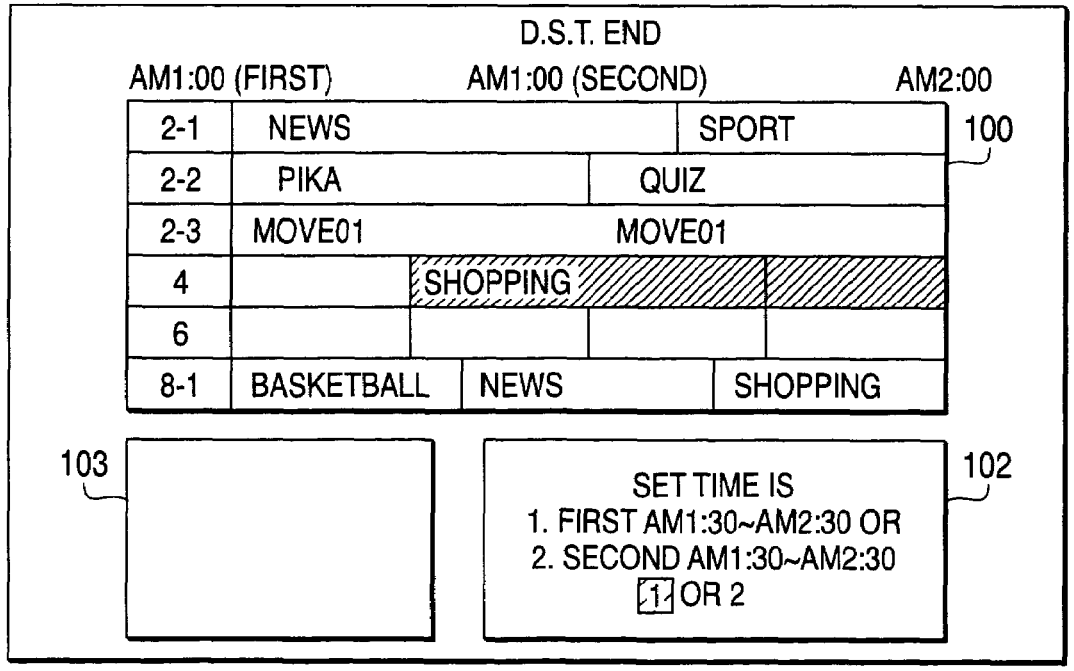
Figure 7C:
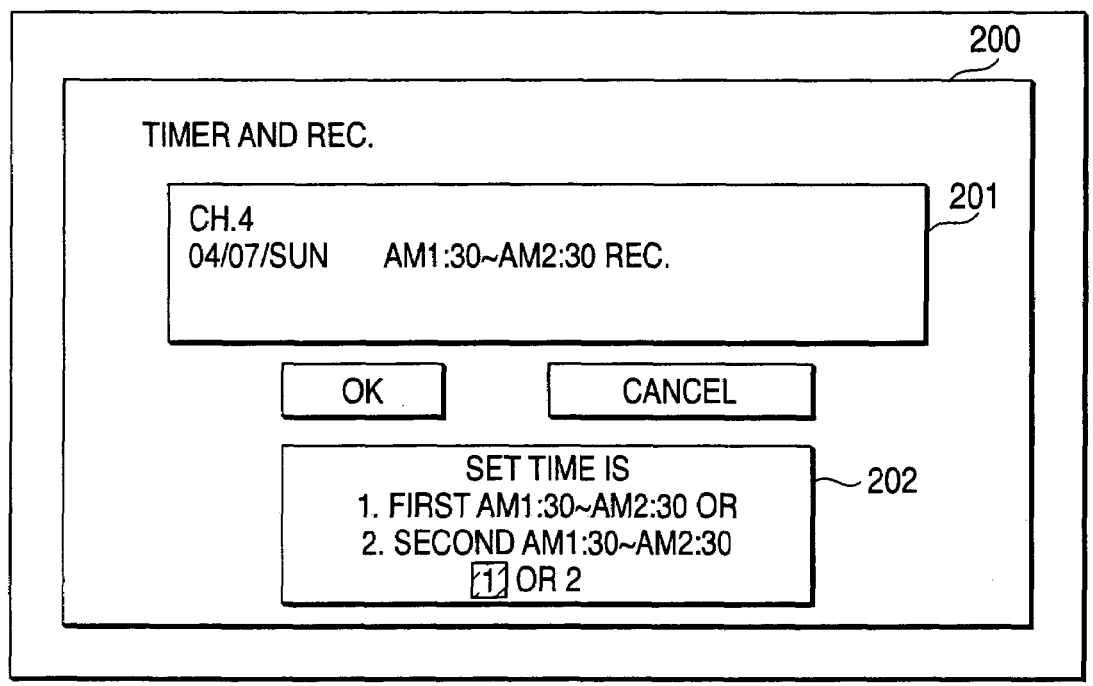

FIGS. 7A and 7C show the viewing/recording reservation image 200, and FIG. 5B shows an EPG image in which reservation of FIG. 7A is made.

When the user selects the time repeated at the time of ending the summer time, for example, a recording reservation for channel 6 from AM 1:30 to AM 2:30 at the last Sunday on October (27th day of October) is made, as shown in FIG. 7A, the corresponding channel and the time zone are displayed in the EPG image, as shown in FIG. 7B. At the time of ending the summer time, because the time from AM 1:00 to AM 2:00 is repeated and exists twice, the start time is indicated at AM 1:30 at the first time and the end time at AM 2:30 in the timetable display frame 100 of the EPG image. Simultaneously, an indication for allowing the user to confirm the start time, which is the first or second AM 1:30, appears in the program content display frame 102. For example, the candidates in the time zone corresponding to the set up by the user are given the choices, whereby let the user to select which is meant in the reservation, as shown in FIG. 7B. The content of the selected program is also displayed in the viewing/recording reservation image 200, whereby the user resets the reservation time by seeing this content. Thereby, the user can easily and surely know that the selection made corresponds to two alternate time at the time of ending the summer time, and can easily make a correction.

Figure 8A:
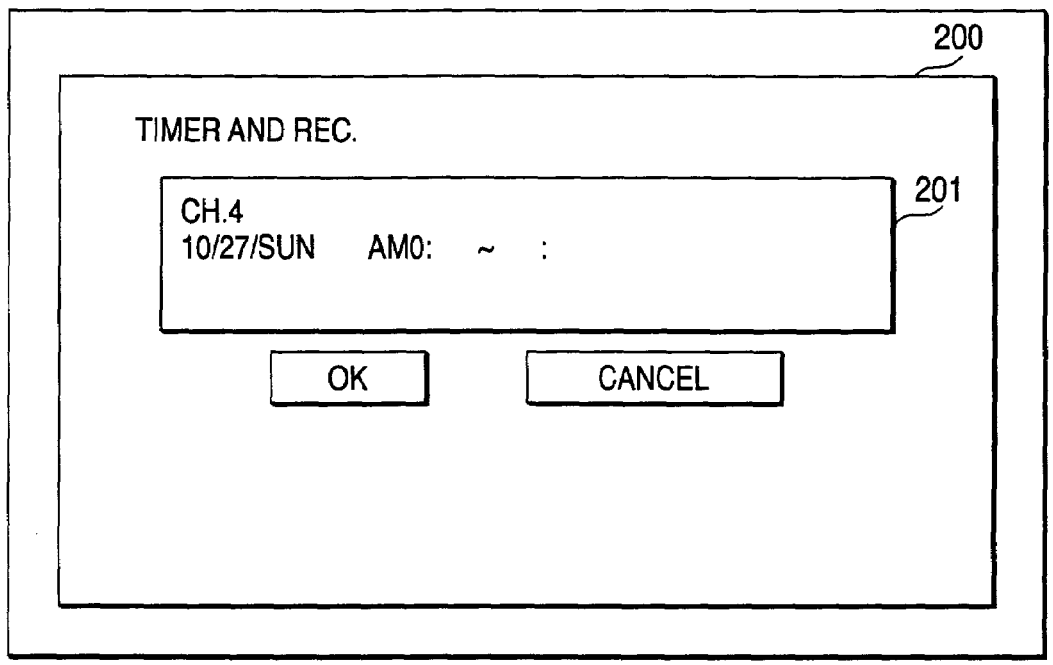
FIGS. 8A, 8B and 8C are views showing a section of the image when a reservation is made using another viewing/recording reservation display frame at the time of ending the summer time.
Figure 8B:
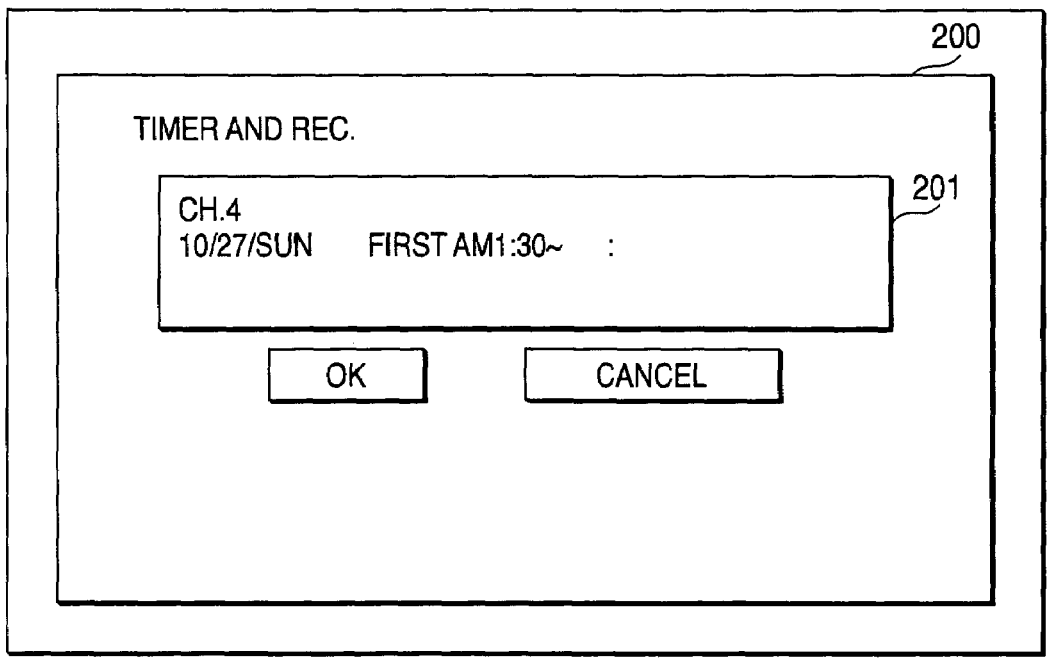
Figure 8C:
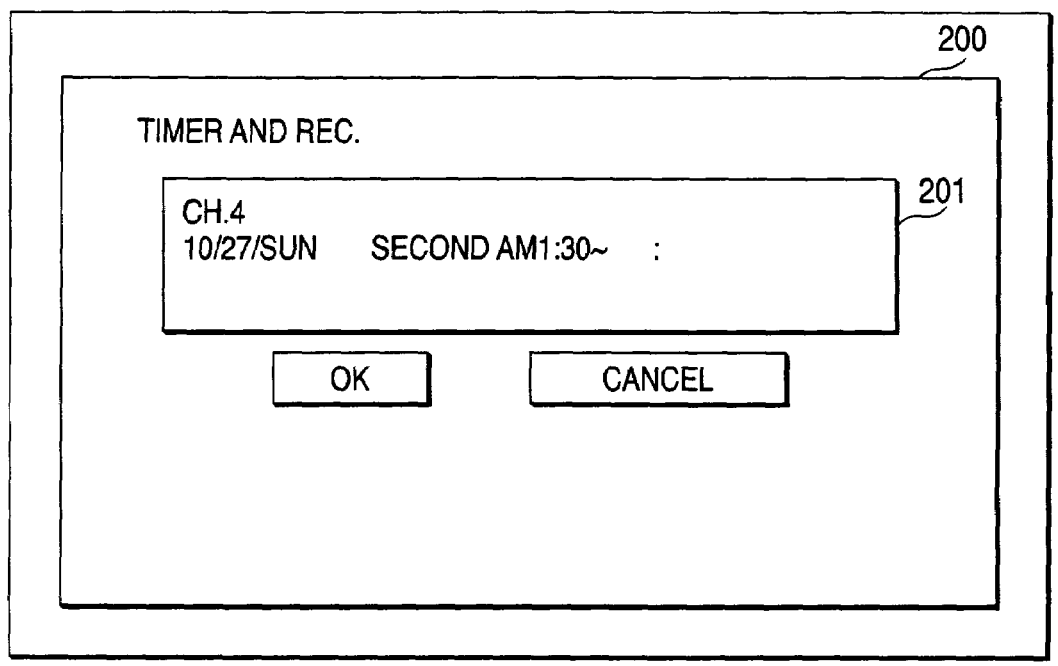
Figure 9:
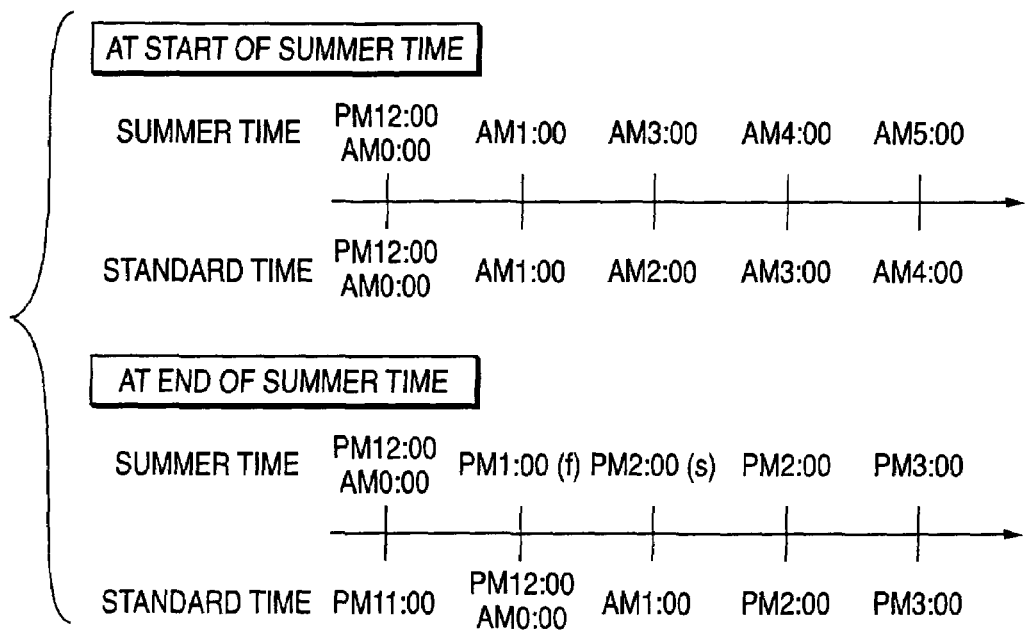
FIG. 9 is a diagram showing the relationship between the summer time and the standard time.
Figure 10:
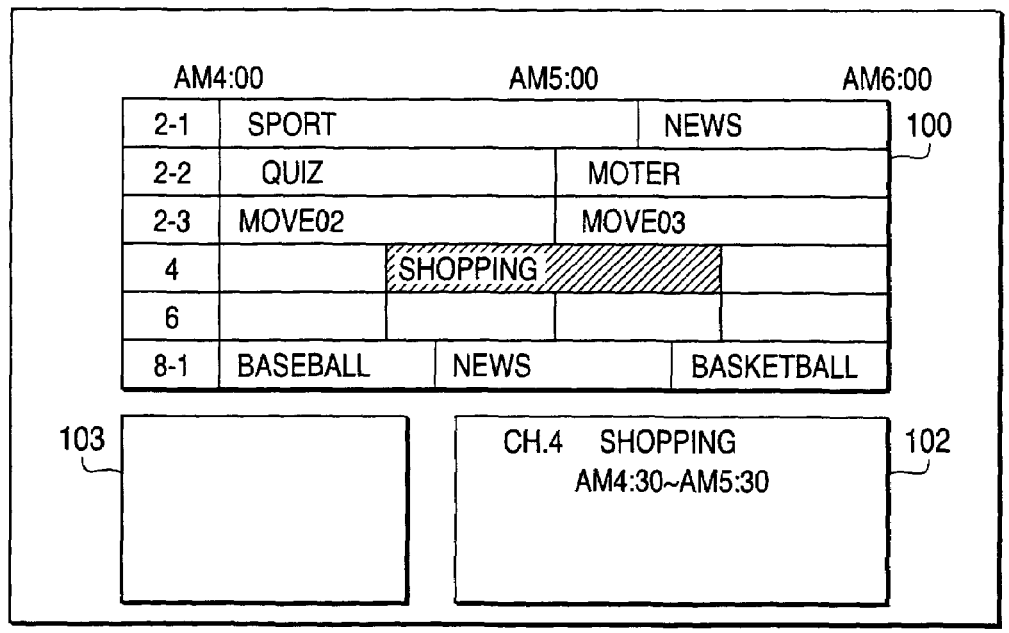
FIG. 10 is a view showing one example of the EPG image.
Figure 11A:
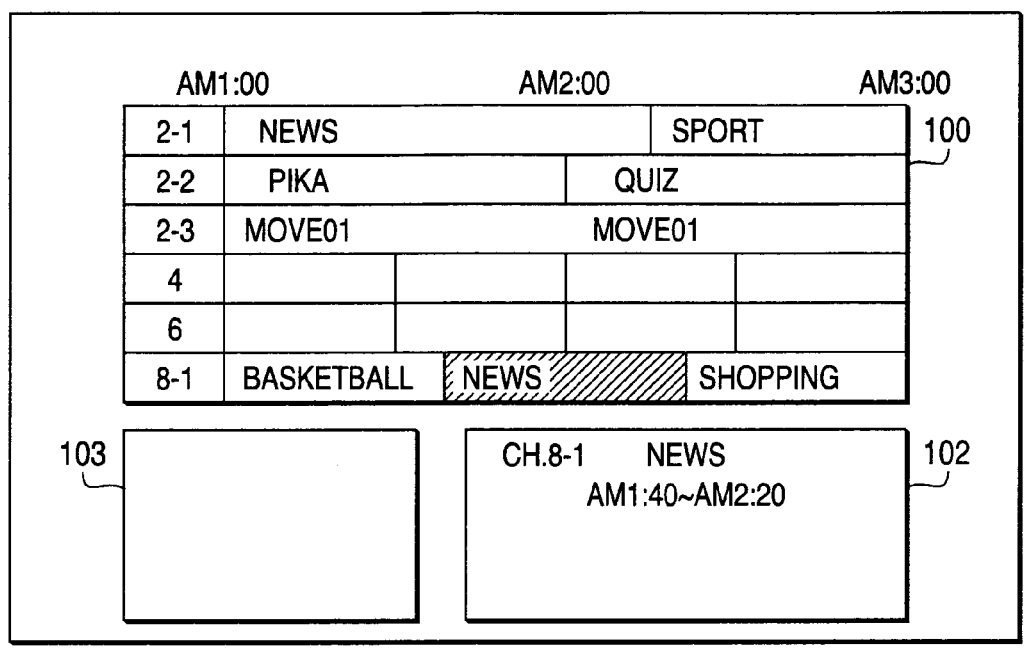
FIGS. 11A and 11B are views showing an EPG image near the time of starting the summer time when the time display is made in the conventional standard time.
Figure 11B:
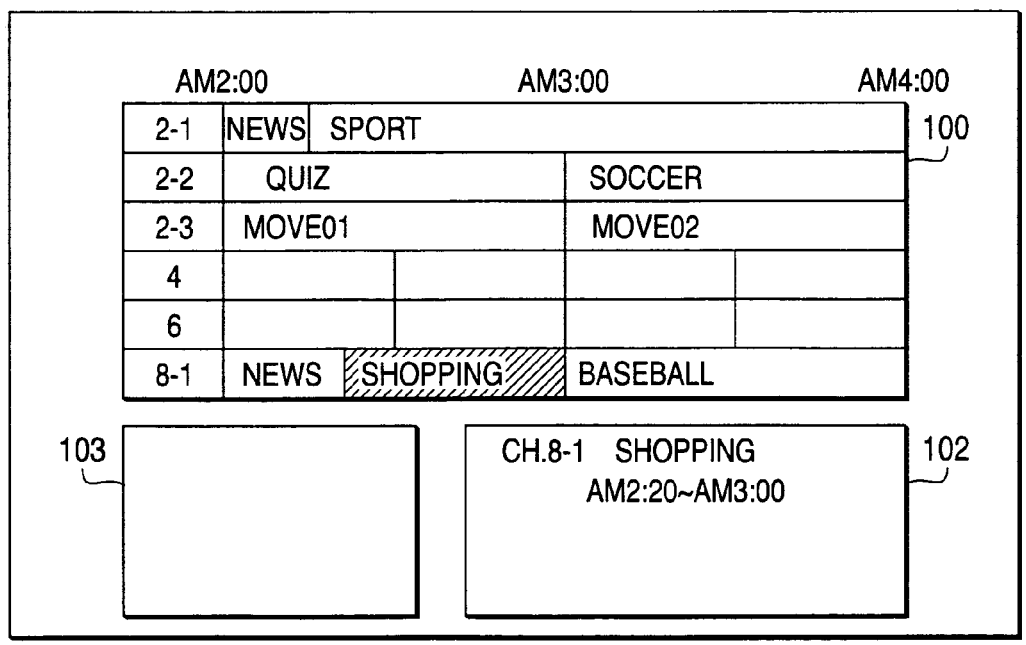
Figure 12A:
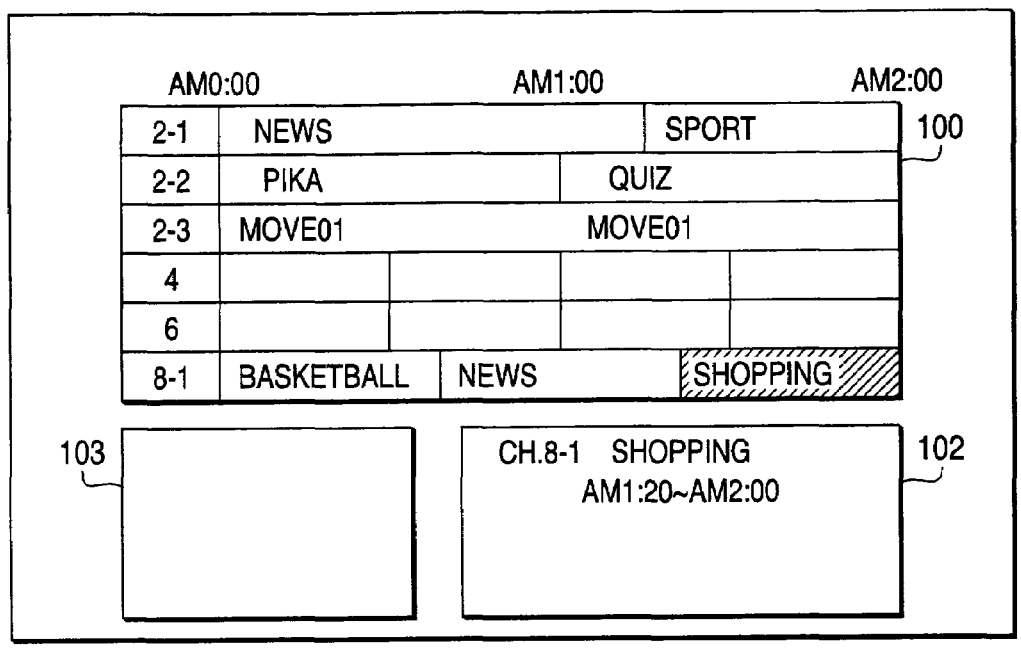
FIGS. 12A and 12B are views showing an EPG image near the time of ending the summer time when the time display is made in the conventional standard time.
Figure 12B:
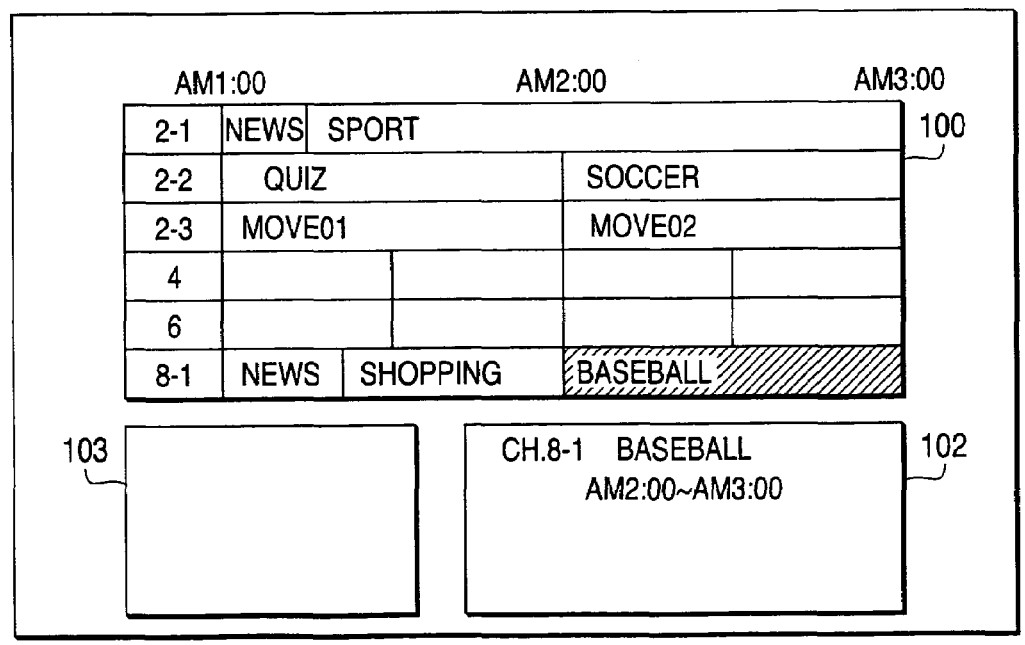

Although in the above explanation, "AM 1:30" is simply set when making the first reservation, "FIRST" or "SECOND" indicating the first or second time may be displayed at the time of setting, as shown in FIG. 8. Accordingly, the user can easily and surely make the reservation.

As described above, according to the embodiment, the time display indicating the time zone deleted at the time of starting the summer time is flashed in the EPG image, and displayed differently from the other time. Accordingly, the user can easily and surely know that the time zone is deleted at the start of the summer time. Also, the time of starting the summer time is displayed in the EPG image, whereby the user can easily and surely know the start time of the summer time. Moreover, at the time of starting the summer time, the deleted time zone is displayed in the program timetable frame of the EPG image to be distinguishable from the other time zones, whereby the user can easily and surely know that the time zone is deleted at the start of the summer time and prevented from any desired program to be missed. Also, when the user makes a viewing/recording reservation in the deleted time zone as the start and end time in the content display frame of the EPG image, the invalid reservation time zone is displayed, whereby the user can easily confirm that the reservation time zone is invalid and promptly change the reservation. Also, since the invalid reservation time zone is indicated, it is possible to avoid the reservation for starting the recording in the time zone differently from an intention of the user.

According to the embodiment, the viewing/recording reservation image is provided separately from the EPG image, and when the user sets the start or end time of reservation in the deleted time zone, it is displayed in the viewing/recording reservation image that the time zone does not exist, whereby the user can easily and surely know that the reservation is invalid and it is necessary to make the reservation again.

According to the embodiment, the time zone repeated at the end of the summer time is continuously displayed in the EPG image, whereby the user can easily and surely know that the repeated time zone exists at the end of the summer time. Since the time display of the EPG image indicates that the time zone is repeated, the user can be more easily and surely informed of the starting and ending of the summer time. When the user makes a reservation for viewing or recording in which the start time and the end time take place in the repeated time zone, it is displayed in the content display frame of the EPG image to which time zone the reservation time belongs, whereby the user can easily and surely change the reservation.

According to the embodiment, the viewing/recording reservation image is provided separately from the EPG image, and when the user sets the start or end time of reservation in the repeated time zone, it is displayed in the viewing/recording reservation image that the time zone takes place twice, whereby the user can easily and surely know that the reservation is invalid and it is necessary to make the reservation again.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A video signal receiver comprising: a video generating section adapted to demodulate a received video signal and to output a video image;

an EPG image generating section adapted to generate an EPG image on the basis of an EFG information contained in the video signal, and to output the EPG image to be displayed on a display screen;

a control section adapted to control the video image and the EPG image by controlling the video generating section and the EPG image generating section in accordance with an input made by a user; and a time management section having a perpetual calendar and adapted to store a standard time, a summer time, a start time for transiting from the standard time to the summer time, and an end time for transiting from the summer time to the standard time, wherein the control section comprises a first display part adapted to change a time to be displayed in the EPG image on the basis of the time information stored in the time management section, to selectively display the EPG image in the standard time or summer time on the basis of the perpetual calendar, and to display the start time of summer time and the end time of summer time when the EPG image is displayed in the summer time, and wherein the control section further comprises:

(1) a second display part adapted to display, at the time of starting the summer time, a time zone to be deleted due to the starting of the summer time and, when a time zone for making a viewing or a recording relates to the time zone to be deleted, an indication in the EPG image that the time zone to be deleted does not exist, wherein the time zone to be deleted corresponds to a time duration between an ending time of the standard time and a starting time of the summer time;

(2) a third display part adapted to generate a reservation content display image for displaying a viewing/recording reservation, which is different from the EPG image, on the basis of a viewing/recording reservation information input by the user, and to display, when a time zone for making a viewing or a recording relates to the time zone to be deleted due to the starting of the summer time, an indication in the reservation content display image that the time zone to be deleted does not exist;

(3) a fourth display part adapted to display, at the time of ending the summer time, a time zone repeated at the time of ending the summer time in a continuous manner in the EPG image, to display an indication that each of the time zone repeated corresponds to a first time zone and a second time zone in the EPG image, to display an indication in the EPG image tat the time zone repeated takes place twice repetitively, and to display, when the time zone for making a viewing or a recording relates to the time zone to be repeated, an indication to let the user to select the time zone for making the viewing or the recording from the first time zone and the second time zone, wherein the time zone repeated corresponds to a time duration in which the summer time is overlapped with the standard time;

(4) a fifth display part adapted to generate the reservation content display image for displaying the viewing/recording reservation, which is different from the EFG image, on the basis of the viewing/recording reservation information input by the user, to display, when a time zone for making a viewing or a recording relates to the time zone to be repeated due to the ending of the summer time, an indication in the reservation content display image that the time zone repeated takes place twice repetitively, and to display an indication to let the user to select the time zone for making the viewing or the recording from the first time zone and the second time zone.

2. A video signal receiver comprising: a video generating section adapted to demodulate a received video signal and to output a video image;

an EPG image generating section adapted to generate an EPG image on the basis of an EPG information contained in the video signal, and to output the EPG image to be displayed on a display screen; a control section adapted to control the video image and the EPG image by controlling the video generating section and the EPG image generating section in accordance with an input made by a user; and a time management section having a perpetual calendar and adapted to store a standard time, a summer time, a start time for transiting from the standard time to the summer time, and an end time for transiting from the summer time to the standard time, wherein the control section comprises a display part adapted to change a time to be displayed in the EPG image on the basis of the time information stored in the time management section, and to selectively display the EPG image in the standard time or summer time on the basis of the perpetual calendar, wherein the display part displays, when a time zone for making a viewing or a recording relates to a time zone to be deleted due to the starting of the summer time, an indication in the EPG image that the time zone to be deleted does not exist, and wherein the time zone to be deleted corresponds to a time duration between an ending time of the standard time and a starting time of the summer time.

3. The video signal receiver as claimed in claim 2, wherein the display part displays the start time of summer time and the end time of summer time in the EPG image when the EPG image is displayed in the summer time.

4. The video signal receiver as claimed in claim 2, wherein the display part displays a time zone to be deleted due to the starting of the summer time, on the basis of information relating to the starting time of the summer time stored in the time management section.

5. The image signal receiver as claimed in claim 2, wherein the display part generates a reservation content display image for displaying a viewing/recording reservation, which is different from the EPG image, on the basis of a viewing/recording reservation information input by the user, and displays, when a time zone for making a viewing or a recording relates to a time zone to be deleted due to the starting of the summer time, an indication in the reservation content display image that the time zone to be deleted does not exist.

6. The image signal receiver as claimed in claim 2, wherein the display part displays a time zone repeated at the time of ending the summer time in a continuous manner in the EPG image, on the basis of information relating to the ending time of the summer time stored in the time management section.

7. The image signal receiver as claimed in claim 2, wherein the display part displays an indication that each of a time zone repeated corresponds to a first time zone and a second time zone in the EPG image, on the basis of information relating to the ending time of the summer time stored in the time management section.

8. The image signal receiver as claimed in claim 2, wherein the display part displays, when a time zone for making a viewing or a recording relates to a time zone to be repeated due to the starting of the summer time, an indication in the EPG image that the time zone repeated takes place twice repetitively.

9. The image signal receiver as claimed in claim 2, wherein the display part displays, when a time zone for making a viewing or a recording relates to a time zone to be repeated due to the starting of the summer time, an indication to let the user to select the time zone for making the viewing or the recording from the first time zone and the second time zone.

10. The image signal receiver as claimed in claim 2, wherein the display part generates a reservation content display image for displaying a viewing/recording reservation, which is different from the EPG image, on the basis of a viewing/recording reservation information input by the user, and displays, when a time zone for making a viewing or a recording relates to a time zone to be repeated due to the ending of the summer time, an indication in the reservation content display image that the time zone repeated takes place twice repetitively.

11. The image signal receiver as claimed in claim 2, wherein the display part generates a reservation content display image for displaying a viewing/recording reservation, which is different from the EPG image, on the basis of a viewing/recording reservation information input by the user, and displays, when a time zone for making a viewing or a recording relates to a time zone to be repeated due to the ending of the summer time, an indication to let the user to select the time zone for making the viewing or the recording from the first time zone and the second time zone.

* * * * *